US008665615B2

(12) United States Patent  (10) Patent No.: US 8,665,615 B2
Park et al.  (45) Date of Patent: Mar. 4, 2014

(54) METHOD AND APPARATUS FOR INCREASING THE POWER CAPABILITY OF A POWER SUPPLY

(71) Applicant: Power Integrations, Inc., San Jose, CA (US)

(72) Inventors: Chan Woong Park, Kangnam-Gu (KR); Alex B. Djenguerian, Saratoga, CA (US); Kent Wong, Stanton, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/866,373

(22) Filed: Apr. 19, 2013

(65) Prior Publication Data

US 2013/0232358 A1 Sep. 5, 2013

Related U.S. Application Data

(63) Continuation of application No. 13/371,159, filed on Feb. 10, 2012, now Pat. No. 8,456,871, which is a continuation of application No. 12/542,538, filed on Aug. 17, 2009, now Pat. No. 8,125,801, which is a continuation of application No. 12/249,487, filed on Oct. 10, 2008, now Pat. No. 7,593,242, which is a continuation of application No. 11/177,124, filed on Jul. 8, 2005, now Pat. No. 7,453,709.

(51) Int. Cl.
  *H02M 3/335* (2006.01)
(52) U.S. Cl.
  USPC ..................................... 363/21.13; 363/21.05
(58) Field of Classification Search
  USPC ......... 323/283, 284; 363/21.01, 21.04, 21.05, 363/21.08, 21.12, 21.13, 21.15
  See application file for complete search history.

(56) References Cited

U.S. PATENT DOCUMENTS

| 5,021,937 A | 6/1991 | Cohen |
| 5,335,162 A | 8/1994 | Martin-Lopez et al. |

(Continued)

FOREIGN PATENT DOCUMENTS

| CN | 1365181 A | 8/2002 |
| JP | 06-245503 | 9/1994 |

(Continued)

OTHER PUBLICATIONS

JP 2011-255161—Notice of Grounds of Rejection, issued May 28, 2013, with English Translation (7 pages).

(Continued)

*Primary Examiner* — Adolf Berhane
*Assistant Examiner* — Emily P Pham
(74) *Attorney, Agent, or Firm* — Blakely Sokoloff Taylor & Zafman LLP

(57) ABSTRACT

One controller for a power supply includes an oscillator, a first circuit, a counter, and a pause circuit. The first circuit generates a drive signal to control switching of a switch to regulate an output of the power supply. The first circuit initiates an on time period of the switch in response to both a clock signal of the oscillator and an enable signal that is generated in response to a feedback signal of the power supply. The counter receives the enable signal and generates an output signal when the counter reaches a count value indicating that the enable signal has been idle for an amount of time. The pause circuit generates a pause signal in response to the output signal of the counter. The oscillator is paused in response to the pause signal and a maximum on time period of the switch is extended while the oscillator is paused.

13 Claims, 5 Drawing Sheets

(56) References Cited

U.S. PATENT DOCUMENTS

| | | | |
|---|---|---|---|
| 5,812,383 A * | 9/1998 | Majid et al. | 363/21.05 |
| 5,892,672 A | 4/1999 | Preller | |
| 6,252,783 B1 | 6/2001 | Huh et al. | |
| 6,275,018 B1 | 8/2001 | Telefus et al. | |
| 6,282,110 B1 | 8/2001 | Chen | |
| 6,396,718 B1 * | 5/2002 | Ng et al. | 363/21.07 |
| 7,245,510 B2 * | 7/2007 | Baurle et al. | 363/21.12 |
| 7,272,025 B2 | 9/2007 | Hawley | |
| 7,425,834 B2 * | 9/2008 | Matthews et al. | 324/548 |
| 7,453,709 B2 | 11/2008 | Park et al. | |
| 7,768,802 B2 | 8/2010 | Lee et al. | |
| 2003/0043601 A1 | 3/2003 | Balakrishnan et al. | |
| 2003/0107359 A1 | 6/2003 | Balakrishnan et al. | |
| 2003/0117819 A1 | 6/2003 | Fahlenkamp et al. | |
| 2003/0151928 A1 | 8/2003 | Kobori et al. | |
| 2004/0201937 A1 | 10/2004 | Yoshida | |
| 2004/0218405 A1 | 11/2004 | Yamada et al. | |
| 2009/0040795 A1 | 2/2009 | Park et al. | |
| 2012/0044724 A1 | 2/2012 | Morota et al. | |

FOREIGN PATENT DOCUMENTS

| | | |
|---|---|---|
| JP | 2000-308343 | 11/2000 |
| JP | 2000-324824 | 11/2000 |
| JP | 2002-218749 | 8/2002 |
| JP | 2003-169469 | 6/2003 |
| JP | 2004-312901 | 11/2004 |
| TW | 227633 | 8/1994 |

OTHER PUBLICATIONS

Fairchild Semiconductor Corporation, "FSDM07652R, Green Mode Fairchild Power Switch (FPS™)," Version 1.0.4, www.fairchildsemi.com, pp. 1-19, 2004.

System General Corporation, Product Specification SG6849, "Low-Power Green-Mode PWM Flyback Power Controller without Secondary Feedback," Version 1.1 (IRO33.0026.B0), www.sg.com.tw, pp. 1-15, Mar. 10, 2004.

Koninklijke Philips Electronics N.V., Product Data Sheet, "TEA1622P STARplug™," Rev. 01, pp. 1-16, Mar. 17, 2004.

Semiconductor Components Industries, LLC, "NCP1230, Low-Standby Power High Performance PWM Controller," Rev. 1, http://onsemi.com, pp. 1-21, Jun. 2004.

Power Integrations, Inc., "TNY263-268, TinySwitch®-II Family: Enhanced, Energy Efficient, Low Power Off-line Switcher," pp. 1-24, Apr. 2005.

Power Integrations, Inc., "TNY242-250, TOPSwitch®-GX Family: Extended Power, Design Flexible, EcoSmart®, Integrated Off-line Switcher," pp. 1-52, Apr. 2005.

UCC1807-1/-2/-3, UCC2807-1/-2-3, UCC3807-1/-2-3, "Programmable Maximum Duty Cycle PWM Controller," Texas Instruments, Inc., SLUS163A—Jun. 1997—Revised Aug. 2007, 16 pages.

Pressman, A. et al., "Chapter 2: Switching Power Supply Design," Third Edition, The McGraw Companies, 2009, pp. 46-61 (18 pages).

Rashid, M., "Power Electronics Handbook," Academic Press, A Harcourt Science and Technology Company, 2001, pp. 495-496 (4 pages).

National Semiconductor Corporation, "LM2623—General Purpose, Gated Oscillator Based, DC/DC Boost Converter," DS200388, Dec. 2005 (11 pages).

National Semiconductor Corporation, "LM4804 Boomer® Audio Power Amplifier Series—Low Voltage High Power Audio Power Amplifier," DS201167, Jun. 2005 (17 pages).

"Practical Design Techniques for Power and Thermal Management," Copyright © 1998 by Analog Devices, Inc., pp. 3.26-3.28.

Kelkar, S., "The benefits of on/off control in flyback power supplies," Electronic Products, Dec. 2006, pp. 57-58.

Wong, K. et al., "Energy-Efficient Peak-Current Controlled Power Conversion IC Family Delivers 3 to 28 Watts in Universal-Input Flyback Power Supplies," Copyright © 2007 IEEE, pp. 325-331.

CN 200610107699.7—First Office Action, Dec. 5, 2008, English Translation (8 pages).

JP 2006189052—First Office Action, mailed Aug. 23, 2011, with English Translation (10 pages).

EP 06 25 3523—European Search Report, dated May 4, 2010, (6 pages).

CN 201010568930.9—Second Office Action, dated May 2, 2012, with English Translation (11 pages).

JP 2006189052—Final Notice of Grounds of Rejection, mailed May 8, 2012, with English Translation (7 pages).

CN 201010568930.9—Third Office Action, issued Aug. 21, 2012, with English Translation (14 pages).

* cited by examiner

//\*\*

METHOD AND APPARATUS FOR INCREASING THE POWER CAPABILITY OF A POWER SUPPLY

CROSS-REFERENCE TO RELATED APPLICATION

This application is a continuation of U.S. application Ser. No. 13/371,159, filed Feb. 10, 2012, now pending, which is a continuation of U.S. application Ser. No. 12/542,538, filed Aug. 17, 2009, now U.S. Pat. No. 8,125,801, which is a continuation of U.S. application Ser. No. 12/249,487, filed Oct. 10, 2008, now U.S. Pat. No. 7,593,242, which is a continuation of U.S. application Ser. No. 11/177,124, filed Jul. 8, 2005, now U.S. Pat. No. 7,453,709. U.S. application Ser. No. 13/371,159 and U.S. Pat. Nos. 8,125,801, 7,593,242 and 7,453,709 are hereby incorporated by reference.

BACKGROUND

1. Technical Field

The present invention relates generally to electronic circuits, and more specifically, the invention relates to electronic circuits that increase the power capability of a power supply.

2. Background Information

Electronic devices use power to operate. Switched mode power supplies are commonly used to provide clean and steady sources of power for many of today's electronic devices. In a known switched mode power supply, a high voltage alternating current (AC) signal is converted to high voltage direct current (DC) signal with a diode rectifier and capacitor. The high voltage DC signal is received by an energy transfer element and is then converted to a lower DC output voltage, which may be coupled to a load or for example used to power an electronic device.

BRIEF DESCRIPTION OF THE DRAWINGS

The present invention detailed illustrated by way of example and not limitation in the accompanying Figures.

DETAILED DESCRIPTION

Figure 1:
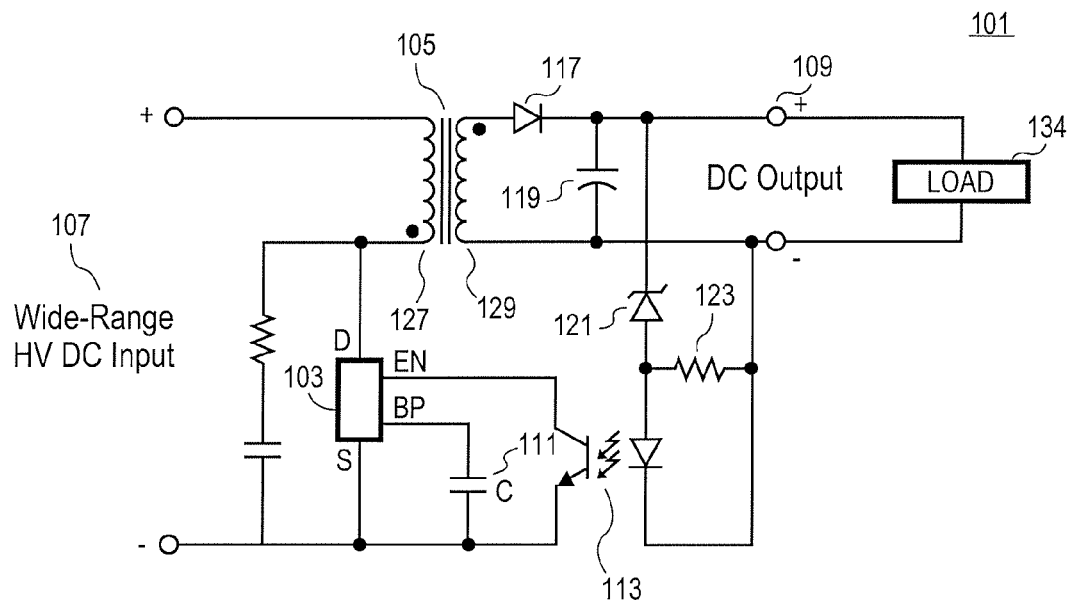
FIG. 1 is an example schematic for an embodiment of an integrated circuit included in a power supply in which power capability of the power supply is increased in accordance with the teaching of the present invention.

Embodiments of electronic circuits that increase the power capability of a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, characteristics, combinations and/or sub-combinations described below and/or shown in the drawings may be combined in any suitable manner in one or more embodiments in accordance with the teachings of the present invention.

FIG. 1 is an example schematic for an embodiment of an integrated circuit 103 included in a power supply 101 in which power capability of the power supply is increased in accordance with the teaching of the present invention. The topology of the power supply illustrated in FIG. 1 is an example switching regulator known as a flyback regulator. It is appreciated that there are many topologies and configurations of switching regulators, and that the flyback topology shown in FIG. 1 is provided to illustrate the principles of an embodiment of the present invention that may apply also to other types of topologies in accordance with the teachings of the present invention.

In FIG. 1, power supply 101 includes an energy transfer element 105 coupled between an input 107 and an output 109 of the power supply 101. The example energy transfer element 105 shown is a transformer having two windings including primary winding 127 at the input and secondary winding 129 at the output. In other examples, the energy transfer element 105 may include a different number of windings in accordance with the teachings of the present invention. In the illustrated example, input 107 is an unregulated wide-range high voltage (HV) direct current (DC) input and output 109 is a DC output coupled to a load 134.

As shown, an integrated circuit 103 is coupled to primary winding 127. For one embodiment, integrated circuit 103 is a switching regulator including an internal switch coupled between the drain D and source S terminals of integrated circuit 103. An internal controller circuit is also included in the example in integrated circuit 103 to control the switching of the switch. In another example, it is noted that the internal switch could also be an external switch that is separate from the integrated circuit 103 in accordance with the teachings of the present invention.

In operation, the switch in integrated circuit 103 is switched to regulate the transfer of energy from the input 107 to the output 109 through the energy transfer element 105. For one embodiment, the operation of the switch in integrated circuit 103 of FIG. 1 produces pulsating current in the rectifier diode 117 at the output, which is filtered by capacitor 119 to produce a substantially constant output voltage at DC output 109 or a substantially constant output current at the load 134. A feedback circuit including Zener diode 121 and resistor 123 at output 109 is used to provide a feedback signal through optocoupler 113 to integrated circuit 103. Optocoupler 113 provides some isolation between the input 107 and output 109 of the power supply 101. As shown in the illustrated example, integrated circuit 103 receives the feedback signal from the output 109 through the enable EN terminal. The feedback signal received through the EN terminal is used by integrated circuit 103 to regulate the output 109 of power supply 101 in accordance with the teachings of the present invention.

For one embodiment, a capacitor C 111 is also coupled to the bypass BP terminal of integrated circuit 103. In the illustrated example, capacitor C 111 is utilized to provide a supply decoupling function for integrated circuit 103 during normal operation. For example, the internal circuitry within integrated circuit 103 receives power or a bias current from multifunction capacitor C 111 to operate the circuitry during normal operation while regulating output 109.

Figure 2:
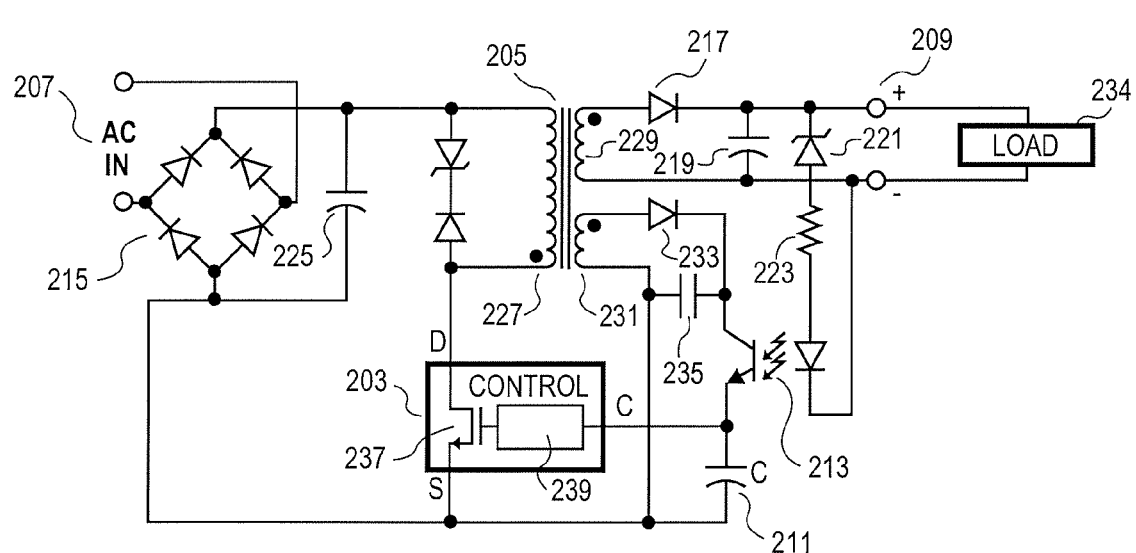
FIG. 2 is another example schematic for an embodiment of an integrated circuit included in a power supply in which power capability of the power supply is increased in accordance with the teaching of the present invention.

FIG. 2 is another example schematic for an embodiment of an integrated circuit 203 included in a power supply 201 in which power capability of the power supply is increased in accordance with the teaching of the present invention. As shown, power supply 201 of FIG. 2 shares similarities with the power supply 101 of FIG. 1. For instance, power supply 201 includes an energy transfer element 205 coupled between an input 207 and an output 209 of the power supply 201. The example energy transfer element 205 shown is a transformer having three windings including primary winding 227 at the input, a secondary winding 229 at the output and a bias winding 231. In the illustrated example, a rectifier 215 is coupled to receive and rectify the alternating current (AC) signal from input 107 and generate a rectified signal that is filtered with capacitor 225 to provide an unregulated HV DC input signal to the primary winding 227. As shown, output 209 is coupled to a load 234.

In the example illustrated in FIG. 2, integrated circuit 203 is a switching regulator including an internal switch 237coupled between the drain D and source S terminals of integrated circuit 203. An internal controller circuit 239 is also included in the example in integrated circuit 203 to control the switching of the switch. In another example, it is noted that the internal switch 237 could also be an external switch that is separate from the integrated circuit 203 in accordance with the teachings of the present invention.

In operation, the switch 237 in integrated circuit 203 is switched to regulate the transfer of energy from the input 207 to the output 209 through the energy transfer element 205. For one embodiment, the operation of the switch 237 produces pulsating current in the rectifier diode 217 at the output, which is filtered by capacitor 219 to produce a substantially constant output voltage at output 209 or a substantially constant output current at the load 234. A feedback circuit including Zener diode 221 and resistor 223 at output 209 is used to provide a feedback signal through optocoupler 213 to integrated circuit 203. A bias current is provided to optocoupler 213 from bias winding 231. The bias current is rectified with rectifier diode 233 and filtered with capacitor 235. Optocoupler 213 provides some isolation between the input 207 and output 209 of the power supply 201. As shown in the illustrated example, integrated circuit 103 receives the feedback signal from the output 209 through the control C terminal. The feedback signal received through the control C terminal is used by integrated circuit 203 to regulate the output 209 of power supply 201 in accordance with the teachings of the present invention.

For one embodiment, a capacitor C 211 is also coupled to the control C terminal of integrated circuit 203. In the illustrated example, capacitor C 211 is utilized for a plurality of purposes including for example providing an integrated circuit supply decoupling function for integrated circuit 203 as well as feedback loop compensation during normal operation. For example, the internal circuitry within integrated circuit 203 receives power or a bias current from multifunction capacitor C 211 through the control C terminal to operate the circuitry during normal operation while regulating output 209.

With respect to the example power supplies 101 and 201 illustrated in FIGS. 1 and 2, respectively, an internal oscillator is included in each of the controllers 103 and 203, which set the power supply operating frequency. Depending on the type of regulator circuit, the oscillator may control the switching frequency of the switch in for example a fixed frequency pulse width modulator (PWM) type regulator circuit or the maximum frequency of operation of the switch in an on/off type regulator circuit. For example, for one embodiment, controller 103 of FIG. 1 is an on/off regulator and controller 203 of FIG. 2 is a PWM regulator circuit in accordance with the teachings of the present invention.

For an on/off regulator example for controller 103 of FIG. 1, the maximum on time for the switch is limited under normal operating conditions since capacitor C 111 coupled to the BYPASS terminal BP of controller 103 is charged during a remaining portion of the overall switching period. In order to make sure there is enough time to charge the capacitor C 111 coupled to the BYPASS terminal BP of controller 103 in normal power supply operating conditions, there is a minimum period during each switching cycle that the switch is off. For example, in a known on/off controller, the maximum on time of the switch may be determined by a maximum duty cycle signal generated from an internal oscillator of the controller. In a known PWM type regulator circuits, the maximum on time within a switching period is normally limited to simplify the task of stabilizing the control loop. In addition, in typical known regulators used in flyback converters, the use of limited a maximum on time during a period, or a maximum duty cycle, is used to help provide a practical energy transfer element design to reduce the need for very large turns ratios between input and output windings of the energy transfer element, which leads to additional losses in the power supply operation.

However, under certain conditions, such as for example temporary very low input voltages, there is an advantage to allowing much longer on time periods for the switch in accordance with the teachings of the present invention. For an embodiment, very low input voltages may exist during abnormal conditions where the input voltage falls due to one or more half cycles of the AC voltage waveform missing. Also, in between the periods where the power supply bulk capacitor is charged from the input AC voltage waveform, the bulk capacitor voltage falls. This fall becomes more significant at the lowest AC voltage frequencies since the time period in between charging of the bulk capacitor gets longer. These minimum input voltage and minimum input voltage frequency conditions are normally the worst case design criteria used to define the energy transfer element. Allowing for these power supply operating conditions with a known fixed maximum duty cycle controller, compromises the power supply design for the remaining range of power supply operating conditions.

As will be discussed, the power delivery capability for an embodiment of a power supply, such as example power supply 101 of FIG. 1 or example power supply 201 of FIG. 2, is improved by recognizing a power supply operating condition where the input voltage is low. For an embodiment, the maximum on period or duty cycle of the switch coupled to the regulator circuit is allowed to be extended in accordance with the teachings of the present invention. For one embodiment, the switch is left on until the current flowing through the switch reaches a threshold value. Until this threshold value is reached, the oscillator circuit in the controller is controlled to extend the oscillator period. Once the switch current threshold is reached, for one embodiment, a minimum off time is maintained to allow energy to be delivered to the output of the power supply in accordance with the teachings of the present invention.

As will be discussed in another example, the maximum on period or duty cycle of the switch coupled to the regulator circuit is extended until either a second absolute maximum (or Abs max) on period, greater than the first maximum on period or until the current flowing through the switch reaches a threshold value. In this example, the second maximum on time period is included as a protection if for some reason the current fails to reach the threshold value for a long period, which could cause excessive power dissipation in the switch leading to very rapid temperature increase in the switch. Under these conditions, the switch is turned off for one embodiment regardless of the current flowing in the switch to ensure the switch is protected.

Figure 3:
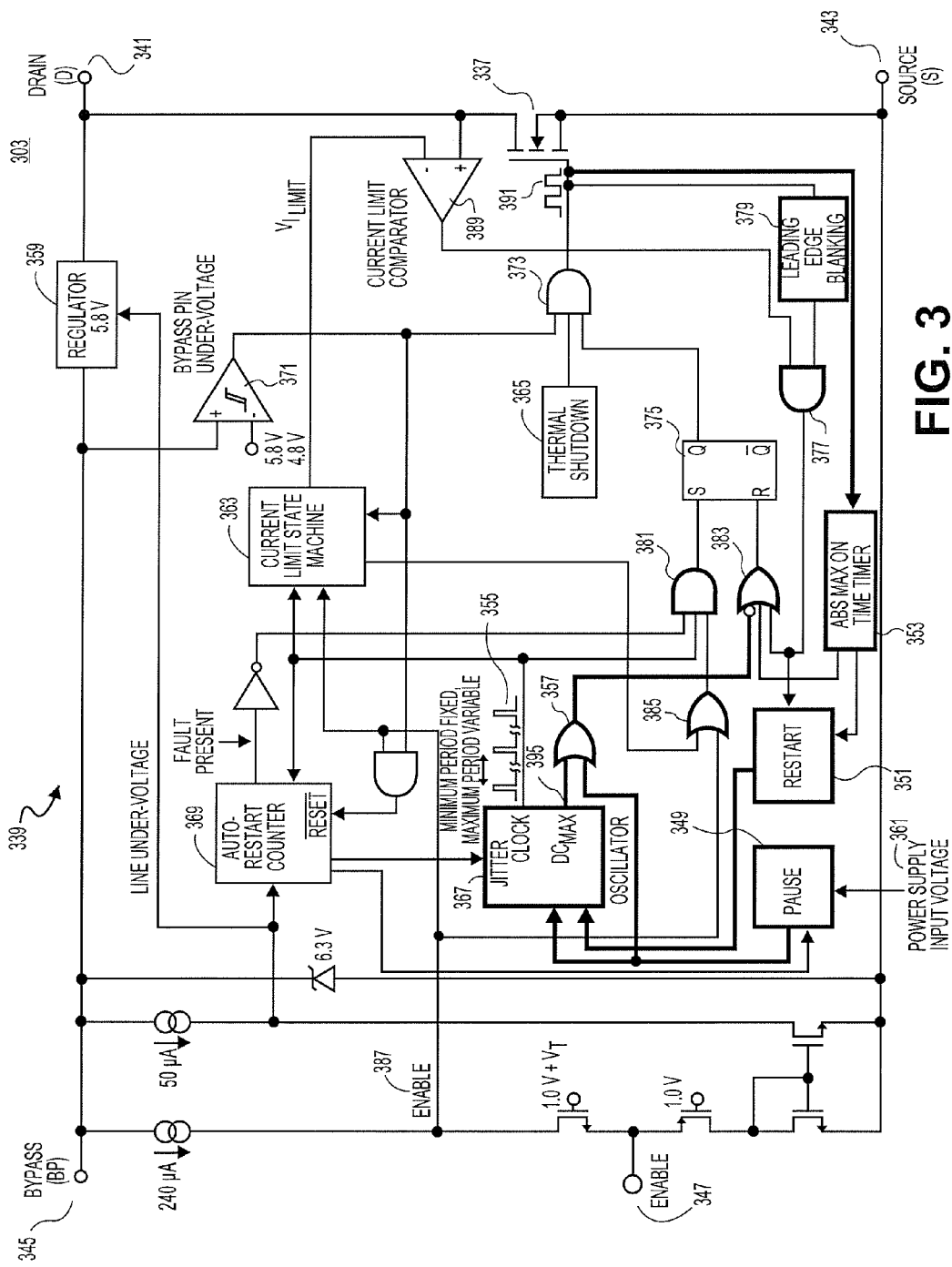
FIG. 3 is an example schematic for an embodiment of a controller with on time extension under various conditions in accordance with the teachings of the present invention.

To illustrate, attention is directed to FIG. 3, which shows generally an example schematic for an embodiment of an integrated circuit 303 including a switch 337 coupled to be controlled by regulator or controller 339 with on time extension under various conditions in accordance with the teachings of the present invention. For one embodiment, controller 339 includes at least all of the elements shown in FIG. 3 except for switch 337. For one embodiment, switch 337 is an external switch that is not included in and separate from integrated circuit 303. For one embodiment, controller 339 and switch 337 are enclosed within a single package. For one embodiment, integrated circuit 303 is a monolithic integrated circuit including controller 339 and switch 337. For one embodiment, switch 337 is a power metal oxide semiconductor field effect transistor (MOSFET).

It is appreciated that example integrated circuit 303 of FIG. 3 may correspond to integrated circuit 103 of FIG. 1 and also shares many similarities with integrated circuit 203 of FIG. 2 in accordance with the teachings of the present invention. Therefore, elements of the example shown in FIG. 3 may be combined with elements of FIGS. 1 and/or 2 in suitable manners in accordance with the teachings of the present invention. In particular, for one embodiment, drain D terminal 341 is to be coupled to an energy transfer element such as primary winding 127 or 227, source S terminal 343 is to be coupled to ground, enable terminal 347 is to be coupled to receive a feedback signal from an output of a power supply, such as for example output 109. A capacitor C 111 may be coupled between bypass BP terminal 345 and source S terminal 343.

In normal operation, the capacitor coupled to bypass BP terminal 345 is charged during initialization via regulator 359 until the capacitor is charged to an adequate level, as determined by bypass pin undervoltage comparator 371. After comparator 371 senses that the capacitor is sufficiently charged, AND gate 373 is enabled to allow drive signal 391 to be output to switch 337 and the auto restart counter 369 is reset accordingly to enable normal operation of integrated circuit 303. During normal operation, switch 337 is switched in response to drive signal 391. If the temperature in integrated circuit 303 becomes excessive, thermal shutdown circuit 365 will disable AND gate 373, which will also disable the drive signal 391 from being output to switch 337, which disables switch 337 from switching.

When switch 337 is enabled to switch to regulate a power supply output during normal operation, feedback from the output of the power supply is received through enable terminal 347 from which the ENABLE signal 387 is generated. As shown, during normal operation, ENABLE signal 387 is generated using bias current supplied from bypass BP terminal through a current source in accordance with the teachings of the present invention. When the ENABLE signal 387 is active in response to the feedback received from the power supply output, the latch 375 is allowed to be set through AND gate 381 and OR gate 385. Accordingly, the CLOCK signal 355 from the oscillator 367 is allowed to set latch 375, from which drive signal 391 is generated through AND gate 373.

In the illustrated example, latch 375 is reset by the output of OR gate 383 in response to the duty cycle max $DC_{MAX}$ signal 395 from oscillator 367, in response to the current through switch 337 exceeding the peak current limit level as identified by current limit comparator 389 through AND gate 377 and OR gate 383 or in response to an output signal from Abs Max ON TIME timer 353. OR gate 357 will block resetting of latch 375 by the $DC_{MAX}$ signal when the output of pause circuit 349 is high. In the illustrated example, a leading edge blanking circuit 379 is also coupled to temporarily disable a current limit signal during the leading edge of each pulse of the drive signal 391.

In operation, pause circuit 349 can pause the oscillator 367 for one of several possible reasons in accordance with the teaching of the present invention. Some or all of the reasons are optional and therefore some or all of the reasons may or may not be all employed using various combinations according to various embodiments of the present invention. For instance, in a one example, pause circuit 349 is coupled to receive a signal 361 responsive to the power supply input voltage. For one embodiment, when the signal 361 indicates that the power supply input voltage is too low, the pause circuit 349 will cause oscillator 367 to pause and will block the duty cycle max $DC_{MAX}$ signal 395 of oscillator 367 from resetting latch 375. This will extend an ON time of switch 337 until for example AND gate 377 goes high due to the current flowing in switch 337 reaching a threshold value determined by the current limit comparator 389. When the signal 361 indicates that the power supply input voltage is not too low, the pause circuit will allow oscillator 367 to oscillate and allow the duty cycle max $DC_{MAX}$ signal 395 of oscillator 367 to reset latch 375 in accordance with the teachings of the present invention. For one embodiment, pause circuit 349 is activated only in response to the signal 361 responsive to the input of the power supply. For one embodiment, the frequency of oscillator 367 is independent of the feedback or enable signal 387 in accordance with the teachings of the present invention.

In another example, auto-restart counter 369 reaches a certain count value, which indicates the feedback or ENABLE signal 387 has been lost or has been idle for an excessive amount of time. For one embodiment, this circumstance could cause the pause circuit 349 to pause the oscillator 367 on each subsequent switching cycle. The loss of the feedback signal or ENABLE signal 387 could be a sign that the input voltage to the power supply is too low and therefore the additional power capability provided by the extended ON time is required in accordance with the teachings of the present invention.

For one embodiment, after the pause circuit 349 has caused the oscillator 367 to be paused, oscillator 367 can be restarted in several ways in accordance with the teachings of the present invention. For instance, in one example, the oscillator 367 is restarted via restart circuit 351 once the current flowing in the switch 337 has reached a threshold value indicated by the output of AND gate 377, which is also received by restart circuit 351.

For one embodiment, an Absolute Maximum ON TIME timer circuit 353 includes a timer that is started once the switch 337 turns ON. In the example illustrated in FIG. 3, Absolute Maximum ON TIME timer circuit 353 coupled to detect drive signal 391 to detect when drive signal 391 turns on switch 337. In another example, Absolute Maximum ON TIME timer circuit 353 may be coupled to detect the current or voltage through or across switch 337 in order to sense when switch 337 is turned on. Restart circuit 351 is coupled to Absolute Maximum ON TIME timer circuit 353 to restart oscillator 367 when an absolute maximum on time has been reached signaled by the output of the Abs Max ON TIME timer circuit 353 or when the current in the switch 337 has reached a threshold value according to current limit comparator 389. For one embodiment, the Abs Max on time could be implemented as a safety net for example if the power supply input voltage signal 361 is so low that the current in the switch 337 never reaches the current limit threshold value according to comparator 389.

It is noted that pausing oscillator 367 as described and illustrated effectively reduces the frequency of the oscillator 367. In another embodiment, it is appreciated that pause circuit 349 could be used to slow down the oscillation of oscillator 367 in accordance with the teachings of the present invention rather than stopping or pausing oscillator 367 altogether in accordance with the teachings of the present invention.

Figure 4:
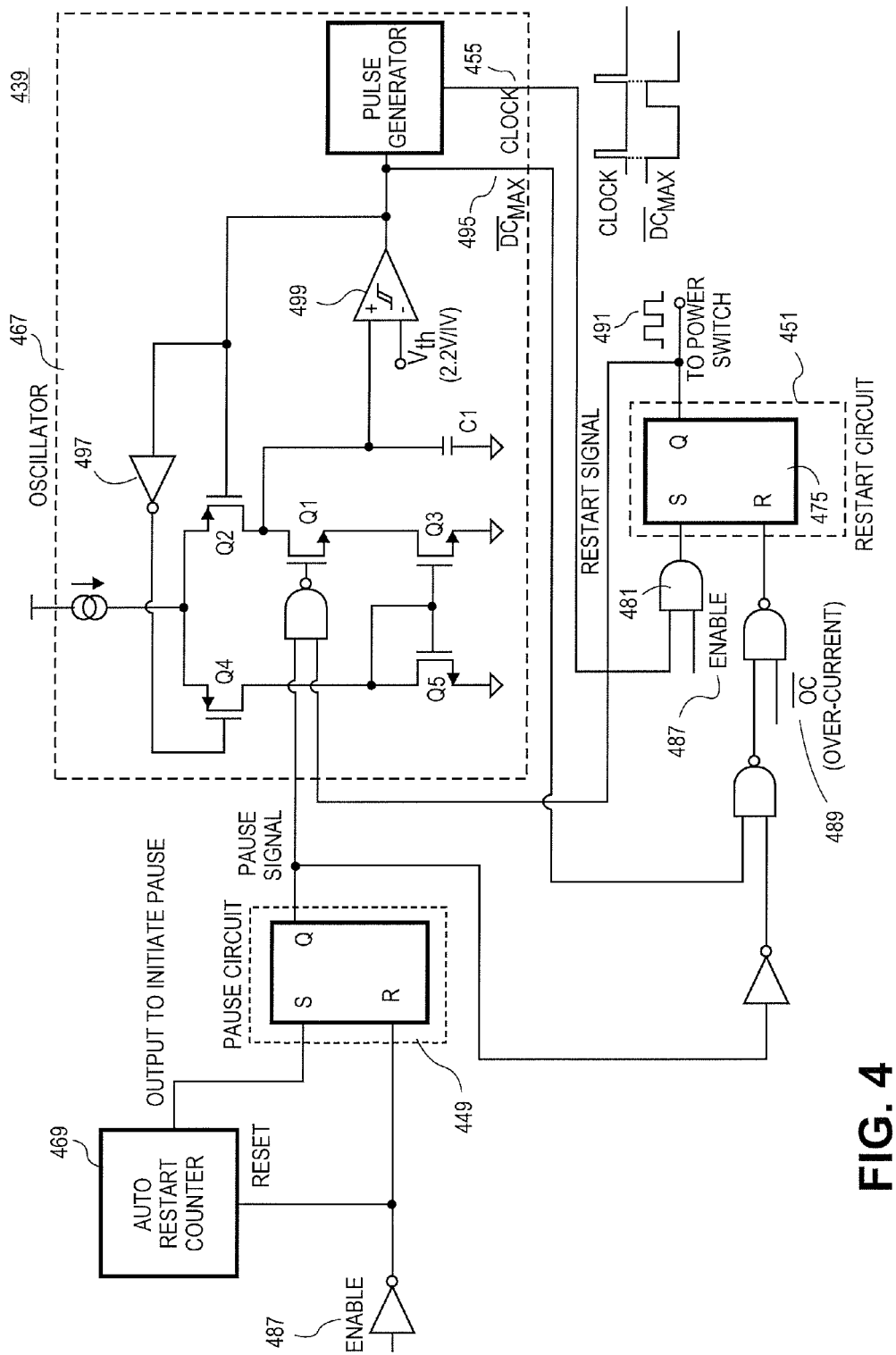
FIG. 4 is a detailed example schematic for an embodiment of a portion of a controller with on time extension after a delayed count period when feedback is lost in accordance with the teachings of the present invention.

FIG. 4 is a example schematic 439 showing increased detail for an embodiment of a portion of a controller, such as for example controller 339, with on time extension after a delayed count period when feedback is lost in accordance with the teachings of the present invention. In particular, it is appreciated that for one embodiment, the schematic 439 is generally portions of controller 339 with increased detail and without Abs Max ON TIME timer circuit 353 in accordance with the teachings of the present invention. In the illustrated example, the maximum on time of the power switch is extended when a feedback signal coupled to the power supply regulator circuit is in a range indicating that extension of the maximum on time of the power switch is required. The power switch may for example correspond to for example power switch 237 of FIG. 2 or power switch 337 of FIG. 3.

For example, the loss of a feedback signal coupled to the controller indicates a range where maximum on time extension could be required since this indicates that the power supply is no longer capable of delivering the output power demanded by the load coupled to the output of the power supply. Such a condition could be the result of the input voltage to the power supply dropping too low for the standard maximum switch on time period to deliver enough energy to the load. For one embodiment, the maximum on time period is extended when the feedback signal has been in a range indicating that extension of the maximum on time of the switch is required, for a period of time.

For example, if the feedback signal is lost, the maximum on time period of the switch is not extended until this condition has existed for a period of time by, for example, using a counter in the regulator circuit to reach a count value after a period of time. This avoids extending the maximum on time period under normal power supply operating conditions where for example the feedback signal can be temporarily lost simply due to load fluctuations at the output of the power supply. Under these normal operating conditions, extending the maximum on time of the switch can create higher root mean square (RMS) current and therefore increased thermal stress in the switch, which is not desirable during normal operation where these conditions could last for long periods.

To illustrate, schematic 439 of FIG. 4 includes an oscillator 467, which generates a CLOCK signal 455 and a $DC_{MAX}$ bar signal 495. In the illustrated example, a restart circuit 451 is coupled to generate a restart signal that is responsive to the CLOCK signal 455, $DC_{MAX}$ bar signal 495, an enable signal 487, an over-current signal 489 and a pause signal. In the illustrated example, restart circuit 451 includes a latch 475, which also generates a drive signal 491, which is coupled to be received by a power switch. In the illustrated example, drive signal 491 is the same signal as the restart signal. A pause circuit 449 is also included to generate the pause signal and is set in response to an auto restart counter 469 and is reset in response to enable signal 487. It is appreciated elements of FIG. 4 correspond to elements illustrated in FIG. 3. For instance, oscillator 467 may correspond to oscillator 367, restart circuit 451 may correspond to restart circuit 351, pause circuit 449 may correspond to pause circuit 349 and auto restart circuit 469 may correspond to auto restart circuit 369.

In operation, the timing capacitor C1 of oscillator 467 is normally charged through transistor Q2 during the on time of the power switch until the $DC_{MAX}$ bar signal 495 is generated at the output of hysteretic comparator 499. Transistor Q2 is then turned off when the output of hysteretic comparator 499 goes high. Inverter gate 497 simultaneously turns on transistor Q4. As shown, a current mirror defined with transistors Q5 and Q3 then discharges timing capacitor C1 of oscillator 467 until the output of hysteretic comparator 499 changes polarity again. This process repeats, which results in the oscillating signals of oscillator 467. This time to discharge timing capacitor C1 sets what is called the minimum off time of the power switch. This minimum off time of the power switch allows time for energy stored in the energy storage element, such as for example energy storage element 105 of FIG. 1 or energy storage element 205 of FIG. 2, during the power switch on time to be transferred to the power supply output. Therefore, for one embodiment, the on time period is followed by a fixed minimum off time period established by the time to discharge timing capacitor C1 under substantially all normal power supply operating conditions in accordance with the teaching of the present invention.

The process described above continues as long as transistor Q1 is turned on. If transistor Q1 is turned off, timing capacitor C1 is not discharged and the oscillator 467 is paused in accordance with the teachings of the present invention. As shown, pause circuit 449 generates the pause signal and restart circuit 451 generates the restart signal. The pause signal and the restart signal are coupled to control transistor Q1 to pause and/or restart the oscillator 467 in accordance with the teachings of the present invention. In the illustrated example, if both the pause and restart signals are high, then transistor Q1 is off and the oscillator 467 is paused. If either of the pause and restart signals go low, then transistor Q1 will turn back on and oscillator 467 is no longer paused. In the illustrated example it is noted that the pause signal is also routed to block the $DC_{MAX}$ signal 495 from resetting the latch 475 of the restart circuit 475, which would turn off the power switch. In the example of FIG. 4, the pause signal can only pause the oscillator during the time that C1 would otherwise be discharging when Q3 is ON and Q2 is OFF. During the period that C1 is being charged by with current flowing through Q2, the pause signal has no effect on the operation of the oscillator 467.

The example in FIG. 4 also shows that if the auto-restart counter 469 is able to count to a value set in the controller design, then pause circuit 449 is set, which would generate a high pause signal. Any time an enable signal 487 pulse is detected from the feedback signal coupled to the controller, this indicates that the power supply output is back in regulation. At this time, ON time extension is no longer required in accordance with the teachings of the present invention. Accordingly, the pause signal output from pause circuit 449 is reset to be low, which turns transistor Q1 back on, which allows timing capacitor C1 to charge and discharge normally and enables oscillator 467 to oscillate normally in accordance with the teachings of the present invention.

Figure 5:
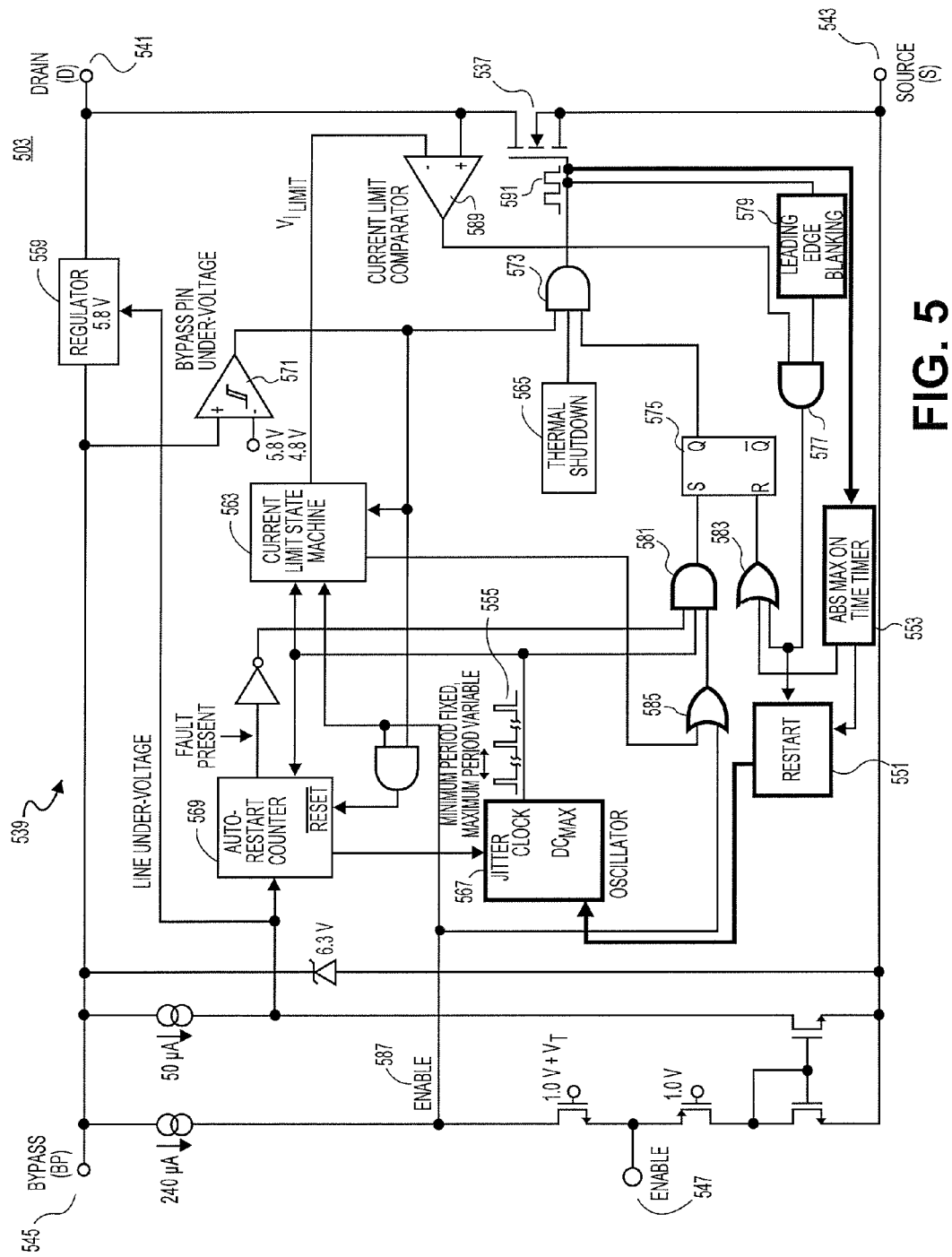
FIG. 5 is an example schematic for an embodiment of a controller with constant on time extension in accordance with the teachings of the present invention.

FIG. 5 is another example schematic for an embodiment of an integrated circuit 503 including a switch 537 coupled to be controlled by a regulator or controller 539 with constant on time extension in accordance with the teachings of the present invention. For one embodiment, controller 539 includes at least all of the elements shown in FIG. 5 except for switch 537. For one embodiment, switch 537 is an external switch that is not included in and separate from integrated circuit 503. For one embodiment, controller 539 and switch 537 are enclosed within a single package. For one embodiment, integrated circuit 503 is a monolithic integrated circuit including controller 539 and switch 537. For one embodiment, switch 537 is a power MOSFET.

Like integrated circuit 303 of FIG. 3, it is appreciated that example integrated circuit 503 of FIG. 5 may also correspond to integrated circuit 103 of FIG. 1, also shares many similarities with integrated circuit 203 of FIG. 2 and shares many similarities with integrated circuit 303 of FIG. 3 in accordance with the teachings of the present invention. Therefore, elements of the example shown in FIG. 5 may be combined with elements of FIGS. 1, 2 and/or 3 in suitable manners in accordance with the teachings of the present invention. In particular, for one embodiment, drain D terminal 541 is to be coupled to an energy transfer element such as primary winding 127 or 227, source S terminal 543 is to be coupled to ground, enable/undervoltage (EN/UV) terminal 547 is to be coupled to receive a feedback signal from an output of a power supply, such as for example output 109. A capacitor C 211 may be coupled between bypass BP terminal 545 and source S terminal 543.

In normal operation, the capacitor coupled to bypass BP terminal 545 is charged during initialization via regulator 559 until the capacitor is charged to an adequate level, as determined by bypass pin undervoltage comparator 571. After comparator 571 senses that the capacitor is sufficiently charge, AND gate 573 is enabled to allow drive signal 591 to be output to switch 537 and the auto restart counter 569 is reset accordingly to enable normal operation of integrated circuit 503. During normal operation, switch 537 is switched in response to drive signal 591. If the temperature in integrated circuit 503 becomes excessive, thermal shutdown circuit 565 will disable AND gate 573, which will also disable the drive signal 591 from being output to switch 537, which disables switch 537 from switching.

When switch 537 is enabled to switch to regulate a power supply output during normal operation, feedback from the output of the power supply is received through enable terminal 547 from which the ENABLE signal 587 is generated. As shown, during normal operation, ENABLE signal 587 is generated using bias current supplied from bypass BP terminal through a current source in accordance with the teachings of the present invention. When the ENABLE signal 587 is active in response to the feedback received from the power supply output, the latch 575 is allowed to be set through AND gate 581 and OR gate 585. Accordingly, the CLOCK signal 555 from the oscillator 567 is allowed to set latch 575, from which drive signal 591 is generated through AND gate 573.

As can be observed, unlike oscillator 367 of integrated circuit 303 in FIG. 3, there is no duty cycle max $DC_{MAX}$ signal externally output from oscillator 567 of FIG. 5 to reset latch 575. Instead, latch 575 is reset in response to a signal from Abs Max ON TIME timer circuit 553 or the current through switch 537 exceeding the peak current limit level as identified by current limit comparator 589 through AND gate 577 and OR gate 583. In the illustrated example, a leading edge blanking circuit 579 is also coupled to temporarily disable a current limit signal during the leading edge of each pulse of the drive signal 591.

In the example schematic illustrated in FIG. 5, the maximum on time of switch 537 is generally always extended if required since there is no duty cycle max $DC_{MAX}$ signal generated by oscillator 567. Thus, the power supply controller 539 allows the switch 537 to stay on until the current threshold or an Abs Max ON time is reached under all power supply operating conditions. As a result, no external signal to integrated circuit 503 or corresponding pause circuit, such as pause circuit 349 of FIG. 3, is needed in order to extend the on time of switch 537 in accordance with the teachings of the present invention. In the example illustrated in FIG. 5, restart circuit 551 is coupled to the output of AND gate 577. In the illustrated example, restart circuit 551 will always pause oscillator 567 if the current limit does not reach the current limit threshold within a first maximum on time as indicated with Abs Max ON TIME timer circuit 553 until the restart circuit 551 determines that oscillator 567 is to start again in accordance with the teachings of the present invention.

Therefore, the oscillator 567 of FIG. 5 still has a fixed maximum frequency, or minimum period time, but has a variable minimum frequency in accordance with the teachings of the present invention. The switching cycle is terminated only when the current threshold is reached or an Abs Max ON TIME period as determined with Abs Max ON TIME timer circuit 553 has been reached for safety.

In the example schematic illustrated in FIG. 5, it is appreciated that Abs Max ON TIME timer circuit 553 and OR gate 583 are not necessarily included for an embodiment of integrated circuit 503. In this example, the output of AND gate 577 is directly coupled to restart circuit 551 and the reset terminal of latch 575 instead of an input of OR gate 583. Without the Abs max ON TIME timer circuit 553, the restart signal from restart circuit 551 is only generated when the current limit has been reached. For another embodiment it is appreciated that since the restart circuit 551 is coupled to receive the same signals that reset the latch 575, that latch 575 could itself be the restart circuit 551 with the Q output of latch 575 coupled to the oscillator 567 as the output of the restart circuit.

Figure 6:
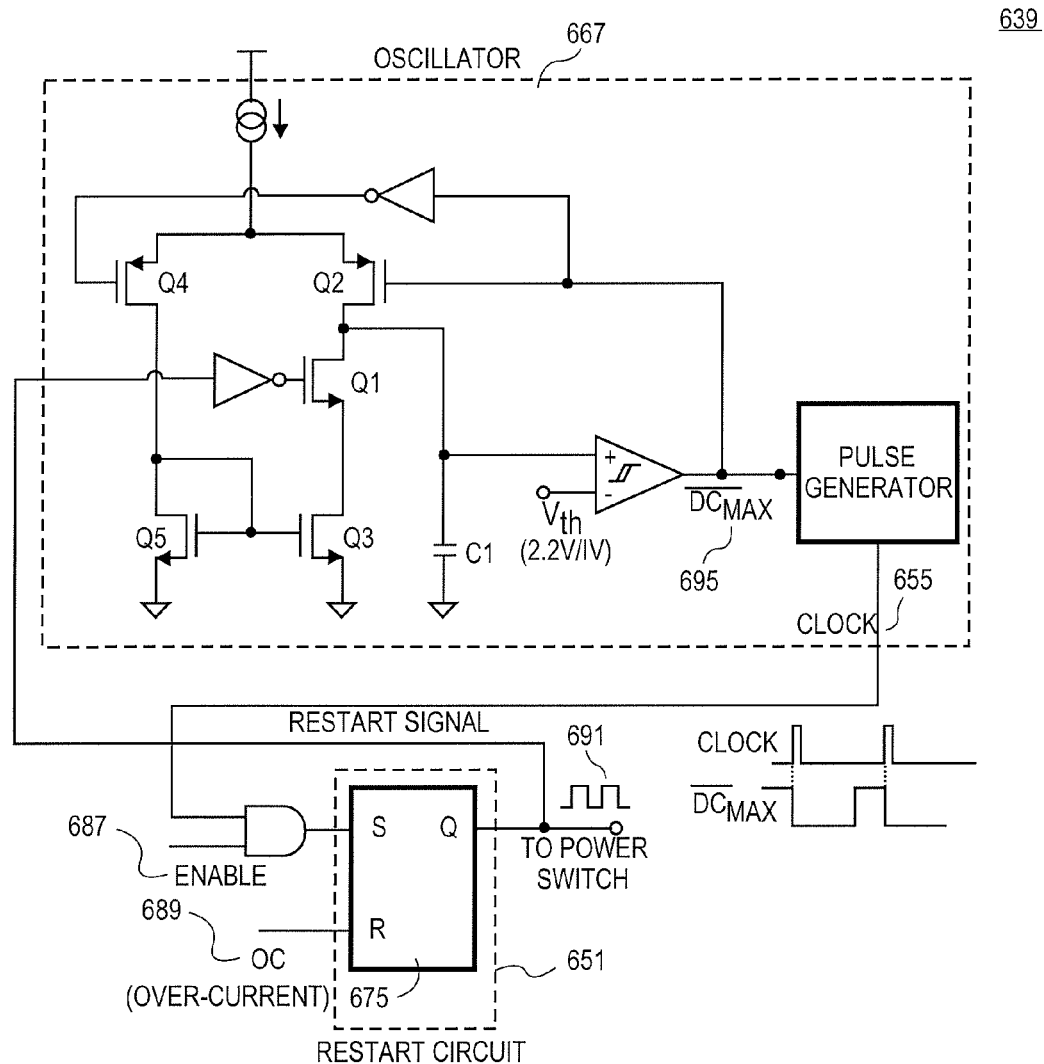
FIG. 6 is a detailed example schematic for an embodiment of a portion of a controller with constant on time extension in accordance with the teachings of the present invention.

To illustrate, attention is directed to FIG. 6, which is a detailed example schematic 639 for an embodiment of a portion of a controller 539 with constant on time extension in accordance with the teachings of the present invention. In particular, it is appreciated that for one embodiment the schematic 639 is generally portions of controller 539 with increased detail in accordance with the teachings of the present invention.

As shown, schematic 639 of FIG. 6 includes an oscillator 667, which generates a CLOCK signal 655. It is noted that an internal duty cycle max $DC_{MAX}$ bar signal 695 as also internally generated in order for oscillator 667 to function correctly, but $DC_{MAX}$ bar signal 695 is not coupled to circuitry external to oscillator 667. In the illustrated example, a restart circuit 651 is coupled to generate a restart signal that is responsive to the CLOCK signal 655, an enable signal 687 and an over-current signal 689. In the illustrated example, restart circuit 651 includes a latch 675, which also generates a drive signal 691, which is coupled to be received by a power switch. In the illustrated example, drive signal 691 is the same signal as the restart signal. It is appreciated elements of FIG.

6 correspond to elements illustrated in FIG. 5. For instance, oscillator 667 may correspond to oscillator 567 and restart circuit 651 may correspond to restart circuit 551.

In operation, the oscillator 667 is automatically paused while the power switch is on in response to the drive signal 691. In particular, when drive signal 691 turns on the power switch, drive signal turns off transistor Q1 in oscillator 667. Like oscillator 467 of FIG. 4, when transistor Q1 is off, timing capacitor C1 is not allowed to be discharged, which results in oscillator 667 being paused. As shown, the latch 675 of reset circuit 651 is only reset in response to the over-current signal 689, which is received with the power switch reaches the threshold value in accordance with the teachings of the present invention. Once the restart circuit 651 is reset, transistor Q2 is turned back on, which allows timing capacitor C1 to be charged and discharged, which results in oscillator 667 being allowed to oscillate in accordance with the teachings of the present invention.

Therefore, if the current flowing in the switch reaches the threshold value within a maximum on time period, being for example the period for which $DC_{MAX}$ bar signal is low, the oscillator period of oscillator 667 is fixed. In this example, the oscillator 667 is therefore a variable frequency for a first range of power supply input voltage conditions, which for example is when the current flowing in the switch does not reach the threshold value during the internally generated maximum on time period, and a fixed frequency for a second range of input voltage conditions, which for example is where the current flowing in the switch reaches the threshold value within the maximum on time period.

For one embodiment, the value of the power supply input voltage determines whether the current in the switch reaches the threshold value during the maximum on time period, since the power supply input voltage determines the rate of change of current in the energy transfer element primary winding, such as primary winding 127 of FIG. 1 or primary winding 227 of FIG. 2, which has an inductance value. The higher the power supply input voltage, the less time it takes for the current in the energy transfer element primary winding 127 or 227 to reach the current limit threshold value. When the power supply input voltage is low, it takes longer for the current flowing through the power switch to reach the threshold value.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

The invention claimed is:

1. A controller for use in a power supply, the controller comprising:
   an oscillator coupled to generate a clock signal;
   a first circuit coupled to generate a drive signal to control switching of a switch to regulate an output of the power supply, wherein the first circuit initiates an on time period of the switch in response to both the clock signal and an enable signal that is generated in response to a feedback signal of the power supply;
   a counter coupled receive the enable signal, wherein the counter is configured to generate an output signal when the counter reaches a count value indicating that the enable signal has been idle for an amount of time; and
   a pause circuit coupled between the counter and the oscillator to generate a pause signal in response to the output signal of the counter, wherein the oscillator is paused in response to the pause signal and a maximum on time period of the switch is extended while the oscillator is paused.

2. The controller of claim 1, wherein the oscillator is coupled to restart in response to the drive signal indicating an end of the on time period of the switch.

3. The controller of claim 2, wherein the first circuit is coupled to end the on time period of the switch in response to an over-current signal indicating that a current through the switch has reached a current limit threshold.

4. The controller of claim 1, wherein the oscillator includes a timing capacitor that is charged and discharged to provide the clock signal.

5. The controller of claim 4, wherein the oscillator is further coupled to generate a duty cycle maximum signal, and wherein the first circuit generates the drive signal to provide a fixed minimum off time period of the switch in response to the duty cycle maximum signal.

6. The controller of claim 5, wherein the fixed minimum off time period is responsive to a time to discharge the timing capacitor.

7. The controller of claim 4, wherein the oscillator is coupled to prevent the discharging of the timing capacitor when the oscillator is paused in response to the pause signal.

8. The controller of claim 4, wherein the oscillator is coupled to allow the discharging of the timing capacitor when the oscillator is restarted in response to the drive signal indicating an end of the on time period of the switch.

9. The controller of claim 8, further comprising a transistor coupled to the timing capacitor, wherein the transistor is turned off in response to the pause signal to prevent the discharging of the timing capacitor, and wherein the transistor is turned on in response to the drive signal to allow the discharging of the timing capacitor.

10. The controller of claim 1, wherein the pause circuit comprises a first latch that is set to generate the pause signal in response to the output signal of the counter and is reset in response to the enable signal.

11. The controller of claim 1, wherein the first circuit comprises a second latch that is set to initiate the on time period of the switch in response to the clock signal and the enable signal.

12. The controller of claim 11, wherein, when the oscillator is not paused, the second latch is reset to end the on time period of the switch in response to either an over-current signal indicating that a current through the switch has reached a current limit threshold or in response to a duty cycle maximum signal indicating that the on time period of the switch has reached a maximum on time.

13. The controller of claim 12, wherein the pause signal is routed to block the duty cycle maximum signal from resetting the second latch while the oscillator is paused.

* * * * *